United States Patent
Kutsubo et al.

(10) Patent No.: US 9,879,762 B2
(45) Date of Patent: Jan. 30, 2018

(54) CONTROL DEVICE OF AUTOMATIC TRANSMISSION

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Hiroyuki Kutsubo, Nagoya (JP); Nobuyuki Hirai, Anjo (JP); Masamichi Yamaguchi, Anjo (JP); Yoshimitsu Hyodo, Nishio (JP); Kenichi Tsuchida, Nishio (JP); Terufumi Miyazaki, Toyota (JP); Youhei Habata, Toyota (JP); Yoshio Hasegawa, Chiryu (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/036,577

(22) PCT Filed: Dec. 24, 2014

(86) PCT No.: PCT/JP2014/084104
§ 371 (c)(1),
(2) Date: May 13, 2016

(87) PCT Pub. No.: WO2015/098939
PCT Pub. Date: Jul. 2, 2015

(65) Prior Publication Data
US 2016/0290443 A1 Oct. 6, 2016

(30) Foreign Application Priority Data
Dec. 26, 2013 (JP) ................... 2013-270360

(51) Int. Cl.
*F16H 3/66* (2006.01)
*F16H 61/04* (2006.01)
(Continued)

(52) U.S. Cl.
CPC ............ *F16H 3/663* (2013.01); *F16H 3/62* (2013.01); *F16H 3/66* (2013.01); *F16H 61/02* (2013.01);
(Continued)

(58) Field of Classification Search
None
See application file for complete search history.

(56) References Cited

U.S. PATENT DOCUMENTS 5,099,718 A * 3/1992 Asada .................... F16H 3/66
475/276
7,785,227 B2 * 8/2010 Wittkopp .............. F16H 3/66
475/276

(Continued)

FOREIGN PATENT DOCUMENTS

JP   S62-147147 A   7/1987
JP   H02-142950 A   6/1990
(Continued)

OTHER PUBLICATIONS

Apr. 7, 2015 Search Report issued in International Patent Application No. PCT/JP2014/084104.

*Primary Examiner* — Robert A Siconolfi
*Assistant Examiner* — Ryan Dodd
(74) *Attorney, Agent, or Firm* — Oliff PLC (57) ABSTRACT

A jump shift of an automatic transmission with multiple shift speeds such as, e.g., ten forward speeds involves operation of many engagement elements. The shifting operation for the jump shift is therefore complicated, making it difficult for the automatic transmission to respond quickly. After (Continued)

shifting to the seventh speed as a direct coupling speed is completed by engaging three clutches C1, C3, C4, the remaining other clutch C2 is also engaged at the seventh speed. In the case of a jump shift, e.g., a shift from the seventh speed to the fifth speed, shifting to the fifth speed is completed by disengaging the clutch C1 and performing control to disengage the clutch C3 and to engage a brake B1 with the remaining other clutch C2 kept in the engaged state. This facilitates the shifting operation from the direct coupling speed and allows the automatic transmission to respond quickly.

5 Claims, 9 Drawing Sheets (51) Int. Cl.
    *F16H 61/02*           (2006.01)
    *F16H 3/62*            (2006.01)
    *F16H 61/686*        (2006.01)

(52) U.S. Cl.
    CPC .......... *F16H 61/04* (2013.01); *F16H 61/686* (2013.01); *F16H 2061/0444* (2013.01); *F16H 2061/0455* (2013.01); *F16H 2200/0069* (2013.01); *F16H 2200/201* (2013.01); *F16H 2200/2023* (2013.01); *F16H 2200/2046* (2013.01)

(56) References Cited

U.S. PATENT DOCUMENTS

| | | | |
|---|---|---|---|
| 8,096,915 B2 | 1/2012 | Wittkopp et al. | |
| 2002/0151409 A1* | 10/2002 | Hayabuchi | F16H 61/061 477/158 |
| 2005/0003924 A1* | 1/2005 | Tabata | F16H 3/66 475/269 |
| 2009/0062056 A1* | 3/2009 | Kato | F16H 3/663 475/275 |
| 2009/0298637 A1* | 12/2009 | Kim | F16H 3/663 475/275 |
| 2011/0301803 A1* | 12/2011 | Shimizu | F16H 61/12 701/29.2 |
| 2015/0285341 A1* | 10/2015 | Beck | F16H 3/66 475/275 |
| 2015/0300457 A1* | 10/2015 | Beck | F16H 3/66 475/275 |
| 2016/0084356 A1* | 3/2016 | Beck | F16H 3/66 475/269 |

FOREIGN PATENT DOCUMENTS

| | | |
|---|---|---|
| JP | H10-311388 A | 11/1998 |
| JP | 2010-106863 A | 5/2010 |
| JP | 2010-121700 A | 6/2010 |

* cited by examiner

|      | C1 | C2  | C3 | C4 | B1 | B2 |
|------|----|-----|----|----|----|----|
| Rev  |    | O   | O  |    |    | O  |
| P, N |    | O   |    |    |    | O  |
| 1st  | O  | O   |    |    |    | O  |
| 2nd  | O  |     |    |    | O  | O  |
| 3rd  |    | O   |    |    | O  | O  |
| 4th  |    |     |    | O  | O  | O  |
| 5th  |    | O   |    | O  | O  |    |
| 6th  | O  |     |    | O  | O  |    |
| 7th  | O  | (O) | O  | O  |    |    |
| 8th  |    |     | O  | O  | O  |    |
| 9th  | O  |     | O  |    | O  |    |
| 10th |    | O   | O  |    | O  |    |

CONTROL DEVICE OF AUTOMATIC TRANSMISSION

TECHNICAL FIELD

Embodiments of the present disclosure relate to control devices of automatic transmissions which attain multiple shift speeds by changing a power transmission path of a shift gear mechanism by using engagement elements such as clutches and brakes.

BACKGROUND ART

A multi-stage automatic transmission is conventionally proposed in which a simple planetary gear and a dual planetary gear having a common carrier are combined with two simple planetary gears, and which attain ten forward speeds and one reverse speed by changing a power transmission path by using four clutches and two brakes (Patent Document 1).

In this multi-stage automatic transmission, the seventh speed is a direct coupling speed at which input and output portions make the same rotation, and the direct coupling speed is attained by engaging three clutches.

RELATED ART DOCUMENTS

Patent Documents

[Patent Document 1] U.S. Pat. No. 8,096,915

SUMMARY

In this multi-stage automatic transmission, one of the clutches is disengaged and one of the brakes is engaged in order to shift from the seventh speed as a direct coupling speed to its adjacent shift speed (the sixth speed or the eighth speed). However, in order to shift from the seventh speed to a shift speed that is two or more speeds higher or lower than the seventh speed (what is called "jump shift"), many engagement elements need to be simultaneously operated in many cases. The shifting operation is therefore complicated, which may impair shifting response.

For example, in the case of shifting from the seventh speed to the fifth speed, it is necessary to disengage two of the three clutches and engage the clutch other than the three clutches and to engage one of the brakes.

It is an object of a preferred embodiment to provide a control device of an automatic transmission which facilitates a shifting operation in many cases in the case of performing shifting after a direct coupling speed is attained.

Means for Solving the Problem

According to a preferred embodiment a control device of an automatic transmission including at least four clutches and two brakes, and a shift gear mechanism that can engage or disengage the clutches and the brakes to change a power transmission path to shift to multiple shift speeds is characterized in that the automatic transmission attains a direct coupling speed (e.g., a seventh speed), which is a shift speed at which input and output portions of the shift gear mechanism make the same rotation, by engaging three of the at least four clutches and disengaging all of the brakes, and after the direct coupling speed is attained, the automatic transmission engages the remaining clutch in a disengaged state out of the at least four clutches at the direct coupling speed so that all of the at least four clutches are engaged.

The automatic transmission shifts from the direct coupling speed (e.g., the seventh speed) to a predetermined shift speed (e.g., a fifth, sixth, eighth, ninth, tenth, first, or reverse speed) by disengaging two of the four clutches that are in the engaged state at the direct coupling speed after the direct coupling speed is attained and engaging one of the brakes.

The automatic transmission jump-shifts from the direct coupling speed to a predetermined shift speed (e.g., the fifth or ninth speed) by disengaging two of the three clutches engaged in order to attain the direct coupling speed and engaging one of the brakes with the remaining clutch, which is engaged after the direct coupling speed is attained, being kept in the engaged state.

The automatic transmission shifts to the predetermined shift speed by changing engagement/disengagement states so as to immediately disengage one of the two clutches that are to be disengaged in order to attain the predetermined shift speed out of the four clutches and so as to gradually disengage the other clutch and gradually engage the one brake that is to be engaged in order to attain the predetermined shift speed.

When jump-shifting from the direct coupling speed (e.g., the seventh speed) to a shift speed (e.g., a second or third speed) that is farther than the predetermined shift speed by disengaging three of the four clutches and engaging the two brakes, the automatic transmission disengages two of the three clutches to be disengaged and engages one of the brakes to first attain the predetermined shift speed (e.g., the sixth or fifth speed), and then gradually disengages the clutch other than the two disengaged clutches out of the three clutches to be disengaged and gradually engages the remaining brake that has not been engaged.

The automatic transmission jump-shifts from the direct coupling speed to a shift speed (e.g., the third speed) that is farther than the predetermined shift speed (e.g., the fifth speed) that is attained by the jump shift, by first attaining the predetermined shift speed by the jump shift and then gradually disengaging the clutch other than the two disengaged clutches out of the three clutches and gradually engaging the remaining brake that has not been engaged.

Figure 1:
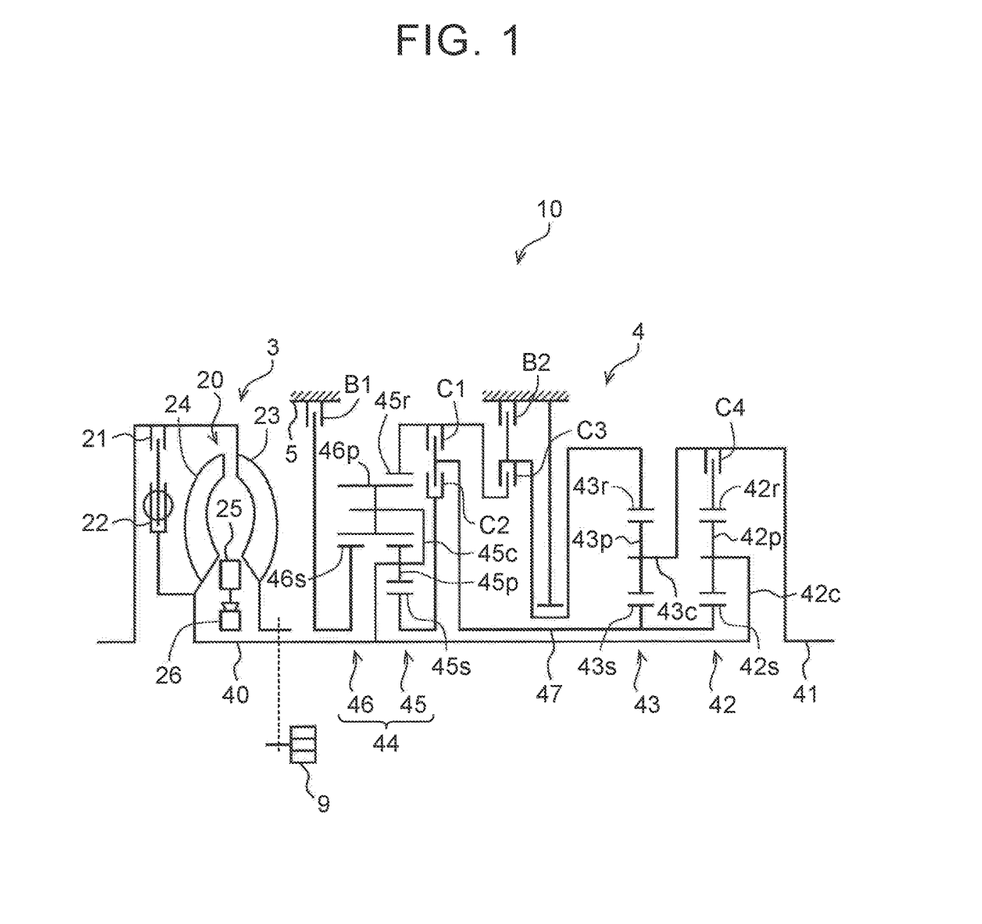
FIG. 1 is a schematic (skeleton) diagram showing an overall power transmission device.
Figure 2:
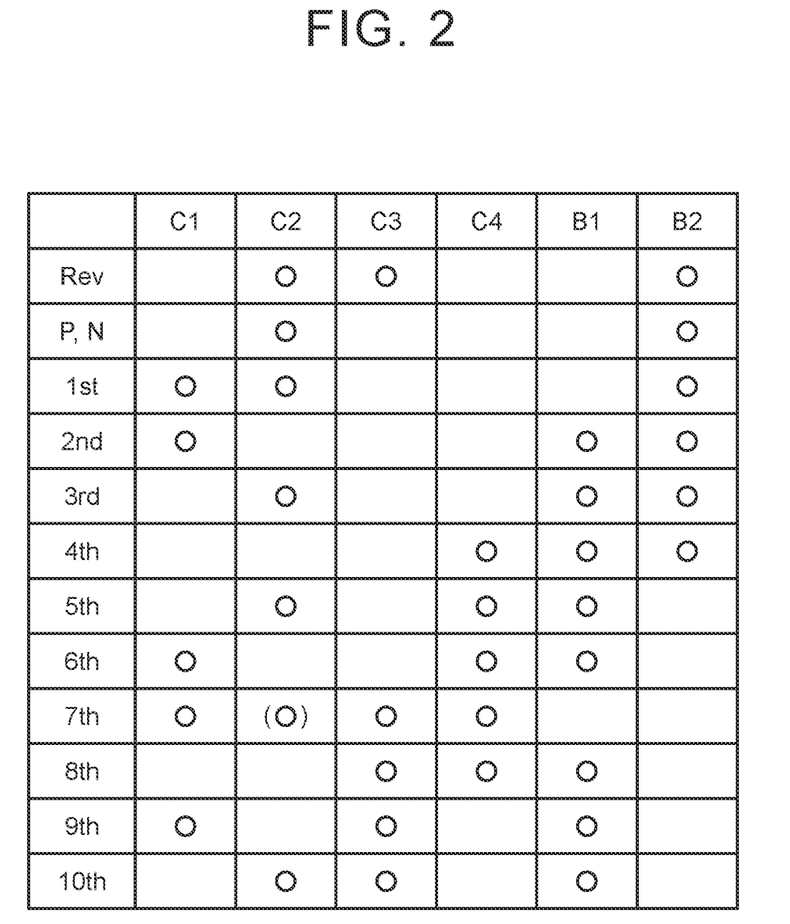
FIG. 2 is an engagement table of engagement elements of an automatic transmission.
Figure 3:
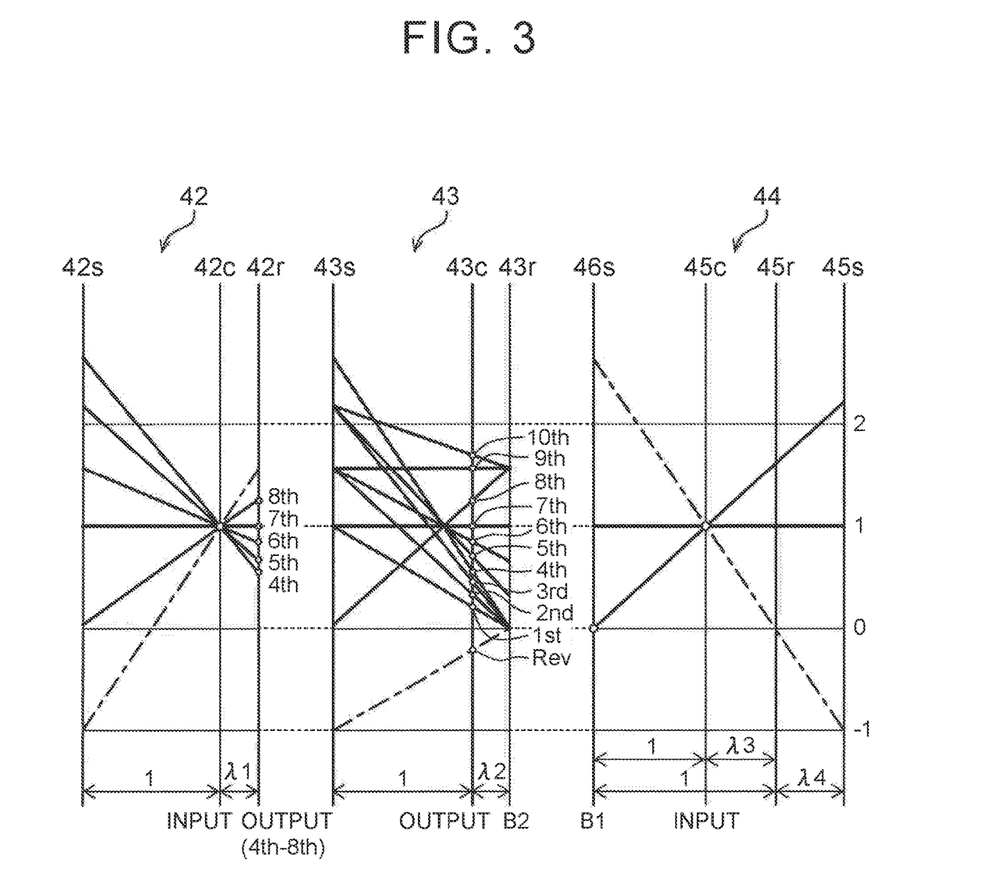
FIG. 3 is a speed diagram of the automatic transmission.

Referring to, e.g., FIGS. 1 to 3, the shift gear mechanism includes a single-pinion type first planetary gear, a single-pinion type second planetary gear, and a Ravigneaux type planetary gear mechanism as a combination of a double-pinion type planetary gear and a single-pinion type planetary gear.

A first carrier of the first planetary gear and a third carrier of the Ravigneaux type planetary gear mechanism are coupled to an input shaft, a second carrier of the second planetary gear is coupled to an output shaft, and a first sun gear of the first planetary gear and a second sun gear of the second planetary gear are coupled together.

A first clutch is interposed between the first and second sun gears coupled together and a third ring gear of the Ravigneaux type planetary gear mechanism. A second clutch is interposed between the first and second sun gears coupled together and a third sun gear of the double pinion type planetary gear of the Ravigneaux type planetary gear mechanism. A third clutch is interposed between a second ring gear of the second planetary gear and the third ring gear of the Ravigneaux type planetary gear mechanism. A fourth clutch is interposed between a first ring gear of the first planetary gear and the output shaft.

A fourth sun gear of the single-pinion type planetary gear of the Ravigneaux type planetary gear mechanism is coupled to a first brake, and the second ring gear is coupled to a second brake.

Ten forward speeds and one reverse speed are attained by engaging or disengaging the first clutch, the second clutch, the third clutch, the fourth clutch, the first brake, and the second brake as appropriate.

The seventh forward speed as the direct coupling speed is attained by engaging the first clutch, the third clutch, and the fourth clutch and disengaging the first brake and the second brake, and the second clutch is engaged at the seventh speed after shifting to the seventh speed is completed.

Reference numerals in the parentheses are merely for reference to the drawings. These reference numerals are not intended to affect in any way the constitution described in the claims.

According to a preferred embodiment, in a multi-stage automatic transmission with, e.g., ten forward speeds etc., the direct coupling speed can be attained by engaging three of the at least four clutches. After shifting to the direct coupling speed is completed, the remaining clutch in a disengaged state is also engaged at the direct coupling speed so that all of the at least four clutches are engaged. This allows the automatic transmission to prepare for shifting from the direct coupling speed (e.g., the seventh speed) to many shift speeds.

According to a preferred embodiment, a shifting operation from the direct coupling speed to many shift speeds (e.g., the first, fifth, sixth, eighth, ninth, and tenth speeds) including the shift speeds (e.g., the sixth and eighth speeds) adjacent to the direct coupling speed can be performed by disengaging two of the four clutches that are in the engaged state at the direct coupling speed and engaging one of the brakes. Accordingly, no clutch needs to be engaged to perform this shifting operation. This facilitates the shifting operation and can improve shifting flexibility and shifting response.

According to a preferred embodiment, in the case of jump-shifting from the direct coupling speed (e.g., the seventh speed) to the predetermined shift speed (e.g., the fifth or tenth speed), the jump shift can be easily and quickly performed by disengaging two of the clutches and engaging one of the brakes with the remaining clutch kept in the engaged state.

According to a preferred embodiment, the shifting operation to the predetermined shift speed is performed by immediately disengaging one of the two clutches that are to be disengaged in order to attain the predetermined shift speed and performing control to gradually disengage the other clutch and to gradually engage one of the brakes. The shifting operation to the predetermined shift speed can thus be easily and quickly performed by smooth shifting with less shift shock.

According to a preferred embodiment, the shifting operation from the direct coupling speed (e.g., the seventh speed) to the shift speed (e.g., the third or second speed) that is farther than the predetermined shift speed (e.g., the sixth, eighth, or fifth speed) can be easily and quickly performed by shifting from the direct coupling speed to the predetermined shift speed and then performing control to gradually disengage one of the clutches and engaging the remaining brake (e.g., B2).

According to a preferred embodiment, the shifting operation from the direct coupling speed to the shift speed (e.g., the third speed) that is farther than the predetermined shift speed (e.g., the fifth speed) that is attained by the jump shift can be easily and quickly performed by first attaining the predetermined shift speed by the jump shift and then performing control to gradually disengage the remaining one clutch and to gradually engage the other brake with the remaining clutch kept in the engaged state.

According to a preferred embodiment, in the automatic transmission that attains the ten forward speeds, the seventh speed as the direct coupling speed is attained by engaging the first clutch, the third clutch, and the fourth clutch, and after shifting to the seventh speed is completed, the second clutch is engaged at the seventh speed. This allows the automatic transmission to easily jump-shift with high responsiveness from this state to many shift speeds with the second clutch kept engaged.

DESCRIPTION

Various embodiments will be described with reference to the accompanying drawings. First, the general configuration of a power transmission device 10 to which a multi-stage automatic transmission of a preferred embodiment can be applied will be described with reference to FIGS. 1 to 4. The power transmission device 10 of the present embodiment is connected to a crankshaft of an engine (internal combustion engine), not shown, as a driving source mounted longitudinally in the front part of a rear wheel drive vehicle or to a rotor of an electric motor, and can transmit power (torque) from the engine etc. to right and left rear wheels (driving wheels), not shown. The power transmission device 10 includes a starting device (hydraulic transmission device) 3, an oil pump 9, an automatic transmission 4 that shifts the power transmitted from the engine etc. to an input shaft 40 to transmit the shifted power to an output shaft 41, and a transmission case 5 accommodating these components.

The starting device 3 includes a torque converter 20, a lockup clutch 21 that can connect and disconnect a front cover coupled to the crankshaft of the engine etc. to and from the input shaft 40 of the automatic transmission 4, and a damper mechanism 22 that is disposed between the front cover and the input shaft 40 of the automatic transmission 4 to damp vibration. The torque converter 20 includes an input-side pump impeller 23 that is coupled to the front cover, an output-side turbine runner 24 that is coupled to the input shaft 40 of the automatic transmission 4, a stator 25 that is placed inside the pump impeller 23 and the turbine runner 24 to adjust the flow of hydraulic oil from the turbine runner 24 to the pump impeller 23, and a one-way clutch 26 that is supported by a stator shaft, not shown, and that restricts the rotation of the stator 25 to only one direction. The torque converter 20 may be a fluid coupling that does not have the stator 25.

The oil pump 9 is configured as a gear pump having a pump assembly including a pump body and a pump cover, an external gear (inner rotor) coupled to the pump impeller 23 of the torque converter 20 via a chain or a gear train, an internal gear (outer rotor) meshing with the external gear, etc. The oil pump 9 is driven by the power from the engine etc. to suction hydraulic oil (ATF) stored in an oil pan, not shown, to pressure-feed the suctioned hydraulic oil to a hydraulic control device 51 (see FIG. 4).

The automatic transmission 4 is configured as a ten-speed transmission, and includes a shift gear mechanism formed by: the input shaft 40; the output shaft 41 that is coupled to the right and left rear wheels via a differential gear and a drive shaft, both not shown; a single-pinion type first planetary gear 42 and a single-pinion type second planetary gear 43 which are arranged side by side in the axial direction of the input shaft 40 and the output shaft 41; and a Ravigneaux type planetary gear mechanism 44 as a compound planetary gear mechanism formed by combination of a double-pinion type planetary gear 45 and a single-pinion type planetary gear 46. The automatic transmission 4 further includes a first clutch C1, a second clutch C2, a third clutch C3, a fourth clutch C4, a first brake B1, and a second brake B2 as six friction engagement elements in order to change a power transmission path from the input shaft 40 to the output shaft 41.

In the present embodiment, the first and second planetary gears 42, 43 and the Ravigneaux type planetary gear mechanism 44 are placed in the transmission case 5 so as to be arranged in order of the Ravigneaux type planetary gear mechanism 44, the second planetary gear 43, and the first planetary gear 42 from the starting device 3 side, namely from the engine side (the left side in FIG. 1). The Ravigneaux type planetary gear mechanism 44 is thus placed on the front side of the vehicle so as to be located near the starting device 3. The first planetary gear 42 is placed on the rear side of the vehicle so as to be located near the output shaft 41. The second planetary gear 43 is placed between the Ravigneaux type planetary gear mechanism 44 and the first planetary gear 42.

The first planetary gear 42 has a first sun gear 42s as an external gear, a first ring gear 42r as an internal gear placed concentrically with the first sun gear 42s, a plurality of first pinion gears 42p each meshing with the first sun gear 42s and the first ring gear 42r, and a first carrier 42c holding the plurality of first pinion gears 42p such that the first pinion gears 42p can rotate (turn). In the present embodiment, the gear ratio $\lambda 1$ of the first planetary gear 42 (the number of teeth of the first sun gear 42s/the number of teeth of the first ring gear 42r) is set to, e.g., $\lambda 1=0.277$.

The first carrier 42c of the first planetary gear 42 is constantly coupled (fixed) to the input shaft 40. Accordingly, when the power is being transmitted from the engine etc. to the input shaft 40, the power from the engine etc. is constantly transmitted to the first carrier 42c via the input shaft 40. The first carrier 42c functions as an input element of the first planetary gear 42. The first ring gear 42r functions as an output element of the first planetary gear 42 when the fourth clutch C4 is in an engaged state.

The second planetary gear 43 has a second sun gear 43s as an external gear, a second ring gear 43r as an internal gear placed concentrically with the second sun gear 43s, a plurality of second pinion gears 43p each meshing with the second sun gear 43s and the second ring gear 43r, and a second carrier 43c holding the plurality of second pinion gears 43p such that the second pinion gears 43p can rotate (turn). In the present embodiment, the gear ratio $\lambda 2$ of the second planetary gear 43 (the number of teeth of the second sun gear 43s/the number of teeth of the second ring gear 43r) is set to, e.g., $\lambda 2=0.244$.

The second sun gear 43s of the second planetary gear 43 is integral with (constantly coupled to) the first sun gear 42s of the first planetary gear 42 and always rotates or stops together with (and coaxially with) the first sun gear 42s. However, the first sun gear 42s and the second sun gear 43s may be formed as separate members and may be constantly coupled together via a coupling member, not shown. The second carrier 43c of the second planetary gear 43 is constantly coupled to the output shaft 41 and always rotates or stops together with (and coaxially with) the output shaft 41. The second carrier 43c thus functions as an output element of the second planetary gear 43. Moreover, the second ring gear 43r of the second planetary gear 43 can be held stationary by the second brake B2 and functions as a fixable element of the second planetary gear 43.

The Ravigneaux type planetary gear mechanism 44 is a compound planetary gear mechanism formed by combination of the third planetary gear 45 as a double-pinion type planetary gear and the fourth planetary gear 46 as a single-pinion type planetary gear. The planetary gears are placed in the transmission case 5 so as to be arranged in order of the fourth planetary gear 46, the third planetary gear 45, the second planetary gear 43, and the first planetary gear 42 from the engine side.

The Ravigneaux type planetary gear mechanism 44 includes a third sun gear 45s and a fourth sun gear 46s as external gears, a third ring gear 45r as an internal gear placed concentrically with the third and fourth sun gears 45s, 46s, a plurality of third pinion gears (short pinion gears) 45p meshing with the third sun gear 45s, a plurality of fourth pinion gears (long pinion gears) 46p meshing with the fourth sun gear 46s and the plurality of third pinion gears 45p and meshing with the third ring gear 45r, and a third carrier 45c holding the plurality of third pinion gears 45p and the plurality of fourth pinion gears 46p such that the plurality of third pinion gears 45p and the plurality of fourth pinion gears 46p can rotate (turn).

The third planetary gear 45 is formed by the third sun gear 45s, the third carrier 45c, the third pinion gears 45p, the fourth pinion gears 46p, and the third ring gear 45r. The fourth planetary gear 46 is formed by the fourth sun gear 46s, the third carrier 45c, the fourth pinion gears 46p, and the third ring gear 45r. In the present embodiment, the Ravigneaux type planetary gear mechanism 44 is configured such that the gear ratio $\lambda 3$ of the third planetary gear 45 (the number of teeth of the third sun gear 45s/the number of teeth of the third ring gear 45r) is, e.g., $\lambda 3=0.488$ and the gear ratio $\lambda 4$ of the fourth planetary gear 46 (the number of teeth of the fourth sun gear 46s/the number of teeth of the third ring gear 45r) is, e.g., $\lambda 4=0.581$.

Of the rotary elements of the Ravigneaux type planetary gear mechanism 44, the fourth sun gear 46s can be held stationary by the first brake B1 and functions as a fixable element of the Ravigneaux type planetary gear mechanism 44. Moreover, the third carrier 45c is constantly coupled (fixed) to the input shaft 40 and is constantly coupled to the first carrier 42c of the first planetary gear 42. Accordingly, when the power is being transmitted from the engine etc. to the input shaft 40, the power from the engine etc. is constantly transmitted to the third carrier 45c via the input shaft 40. The third carrier 45c thus functions as an input element of the Ravigneaux type planetary gear mechanism 44. The third ring gear 45r can be coupled to the sun gear 43s of the second planetary gear 43 and the sun gear 42s of the first planetary gear 42 via the first clutch C2 and an intermediate shaft 47 and can be coupled to the ring gear 43r of the second planetary gear 43 via the third clutch C3. The third ring gear 45r functions as a first output element of the Ravigneaux type planetary gear mechanism 44. The third sun gear 45s can be coupled to the sun gear 43s of the second planetary gear 43 and the sun gear 42s of the first planetary gear 42 via the second clutch C2 and the intermediate shaft 47. The third sun gear 45s functions as a second output element of the Ravigneaux type planetary gear mechanism 44.

The first clutch C1 connects and disconnects the first sun gear 42s of the first planetary gear 42 and the second sun gear 43s of the second planetary gear 43, which are constantly coupled together, to and from the third ring gear 45r of the Ravigneaux type planetary gear mechanism 44. The second clutch C2 connects and disconnects the first sun gear 42s of the first planetary gear 42 and the second sun gear 43s of the second planetary gear 43, which are constantly coupled together, to and from the third sun gear 45s of the Ravigneaux type planetary gear mechanism 44. The third clutch C3 connects and disconnects the second ring gear 43r of the second planetary gear 43 to and from the third ring gear 45r of the Ravigneaux type planetary gear mechanism 44. The fourth clutch C4 connects and disconnects the first ring gear 42r of the first planetary gear 42 to and from the output shaft 41.

The first brake B1 holds (connects) the fourth sun gear 46s of the Ravigneaux type planetary gear mechanism 44 stationary to the transmission case 5 such that the fourth sun gear 46s cannot rotate, and disconnects the fourth sun gear 46s from the transmission case such that the fourth sun gear 46s can rotate. The second brake B2 holds (connects) the second ring gear 43r of the second planetary gear 43 stationary to the transmission case 5 such that the second ring gear 43r cannot rotate, and disconnects the second ring gear 43r from the transmission such that the second ring gear 43r can rotate.

In the present embodiment, multi-plate friction hydraulic clutches that have a hydraulic servo formed by a piston, a plurality of friction engagement plates (e.g., friction plates as annular members having a friction material boned to both surfaces thereof and separator plates as annular members both surfaces of which are smooth), an engagement oil chamber and a centrifugal oil pressure cancel chamber to each of which hydraulic oil is supplied, etc. are used as the first to fourth clutches C1 to C4. Multi-plate friction hydraulic brakes that have a hydraulic servo formed by a piston, a plurality of friction engagement plates (friction plates and separator plates), an engagement oil chamber to which hydraulic oil is supplied, etc. are used as the first and second brakes B1, B2.

FIG. 2 is an engagement table showing the relationship between each shift speed of the automatic transmission 4 and the operating state of the first to fourth clutches C1 to C4 and the first and second brakes B1, B2. FIG. 3 is a speed diagram showing the ratio of the rotational speed of each rotary element to the rotational speed of the input shaft 40 in the automatic transmission 4 (the rotational speed of the input shaft 40, i.e., the first carrier 42c and the third carrier 45c, is the value of 1).

As shown in FIG. 3, the three rotary elements of the single-pinion type first planetary gear 42, namely the first sun gear 42s, the first ring gear 42r, and the first carrier 42c, are arranged in order of the first sun gear 42s, the first carrier 42c, and the first ring gear 42r from the left in the figure at intervals corresponding to the gear ratio $\lambda 1$ on the speed diagram of the first planetary gear 42 (the left speed diagram in FIG. 3). In the present embodiment, according to the order in which the rotary elements are arranged on the speed diagram, the first sun gear 42s is a first rotary element of the automatic transmission 4, the first carrier 42c is a second rotary element of the automatic transmission 4, and the first ring gear 42r is a third rotary element of the automatic transmission 4. Accordingly, the first planetary gear 42 has the first rotary element, the second rotary element, and the third rotary element of the automatic transmission 4 which are sequentially arranged at the intervals corresponding to the gear ratio $\lambda 1$ on the speed diagram.

The three rotary elements of the single-pinion type second planetary gear 43, namely the second sun gear 43s, the second ring gear 43r, and the second carrier 43c, are arranged in order of the second sun gear 43s, the second carrier 43c, and the second ring gear 43r from the left in the figure at intervals corresponding to the gear ratio $\lambda 2$ on the speed diagram of the second planetary gear 43 (the middle speed diagram in FIG. 3). In the present embodiment, according to the order in which the rotary elements are arranged on the speed diagram, the second sun gear 43s is a fourth rotary element of the automatic transmission 4, the second carrier 43c is a fifth rotary element of the automatic transmission 4, and the second ring gear 43r is a sixth rotary element of the automatic transmission 4. Accordingly, the second planetary gear 43 has the fourth rotary element, the fifth rotary element, and the sixth rotary element of the automatic transmission 4 which are sequentially arranged at the intervals corresponding to the gear ratio 2 on the speed diagram.

Moreover, the four rotary elements of the Ravigneaux type planetary gear mechanism 44, namely the fourth sun gear 46s, the third carrier 45c, the third ring gear 45r, and the third sun gear 45s, are arranged in this order from the left in the figure at intervals corresponding to the gear ratio $\lambda 3$ of the single-pinion type fourth planetary gear 46 and the gear ratio 4 of the double-pinion type third planetary gear 45 on the speed diagram of the Ravigneaux type planetary gear mechanism 44 (the right speed diagram in FIG. 3). In the present embodiment, according to the order in which the rotary elements are arranged on the speed diagram, the fourth sun gear 46s is a seventh rotary element of the automatic transmission 4, the third carrier 45c is an eighth rotary element of the automatic transmission 4, the third ring gear 45r is a ninth rotary element of the automatic transmission 4, and the third sun gear 45s is a tenth rotary element of the automatic transmission 4. Accordingly, the Ravigneaux type planetary gear mechanism 44 has the seventh rotary element, the eighth rotary element, the ninth rotary element, and the tenth rotary element of the automatic transmission 4 which are sequentially arranged at the intervals corresponding to the gear ratios $\lambda 3$, $\lambda 4$ on the speed diagram.

Figure 4:
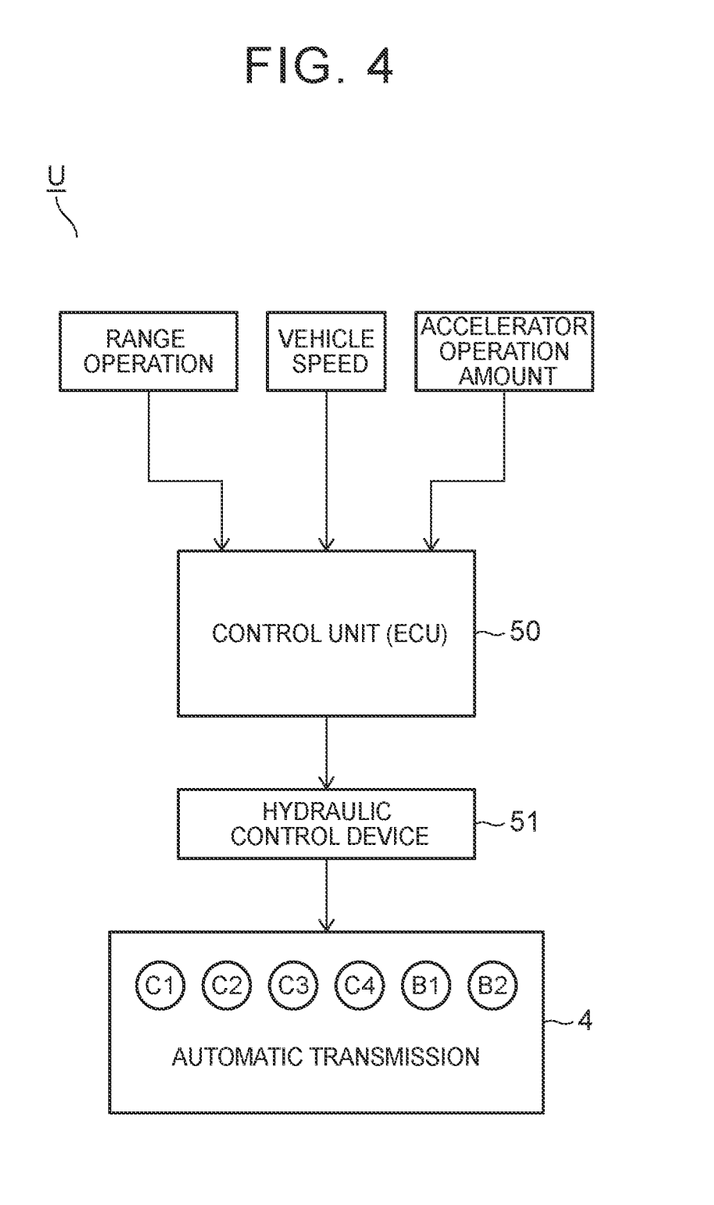
FIG. 4 is a schematic diagram of a control unit and a hydraulic control device.

As shown in FIG. 4, a control device U of the automatic transmission includes: a (electronic) control unit (ECU) 50 that receives signals such as a range operation signal from the driver and signals of a vehicle speed and an accelerator operation amount as a torque request from the driver and outputs a control signal; and the hydraulic control device 51 having valves such as a multiplicity of linear solenoid valves. The control unit 50 determines a shift speed based on the signals and outputs signals of control oil pressures PC1, PC2, PC3, PC4, PB1, PB2 to the linear solenoid valves of the hydraulic control device 51. The hydraulic control device 51 outputs oil pressures regulated by the control oil pressure signals to hydraulic servos C1, C2, C3, C4, B1, B2 of the clutches and the brakes of the automatic transmission 4.

In the automatic transmission 4 thus configured, the first to fourth clutches C1 to C4 and the first and second brakes B1, B2 shown in the skeleton diagram of FIG. 1 are engaged or disengaged according to the combinations shown in the engagement table of FIG. 2 to attain first to tenth forward speeds (1st to 10th) and a reverse speed (Rev) at the rotational speed ratios shown in the speed diagram of FIG. 3.

The seventh forward speed is basically attained by engaging the first clutch C1, the third clutch C3, and the fourth clutch C4 and disengaging the remaining second clutch C2, the first brake B1, and the second brake B2. That is, when attaining the seventh forward speed, the first sun gear 42s of the first planetary gear 42 and the second sun gear 43s of the second planetary gear 43 are connected to the third ring gear 45r of the Ravigneaux type planetary gear mechanism 44 by the first clutch C1, the second ring gear 43r of the second planetary gear 43 is connected to the third ring gear 45r of the Ravigneaux type planetary gear mechanism 44 by the third clutch C3, and the first ring gear 42r of the first planetary gear 42 is connected to the output shaft 41 and the second carrier 43c of the second planetary gear 43 by the fourth clutch C4. In the present embodiment, the gear ratio γ7 at the seventh forward speed is γ7=1.000.

Figure 5:
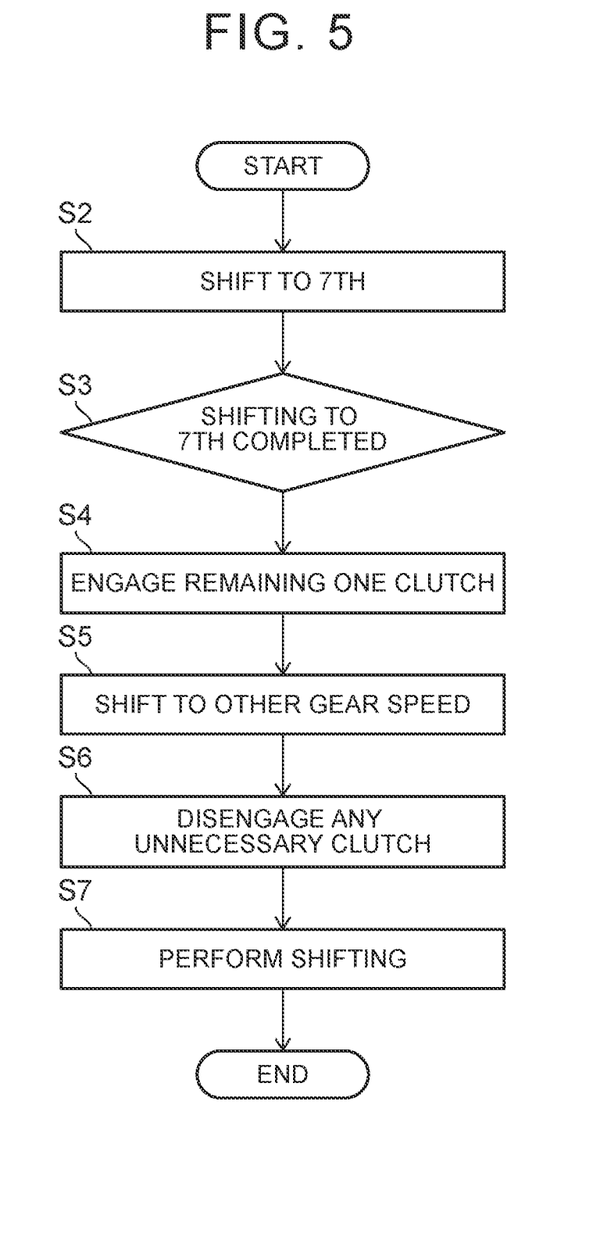
FIG. 5 is a flowchart showing a main part of a preferred embodiment.
Figure 6:
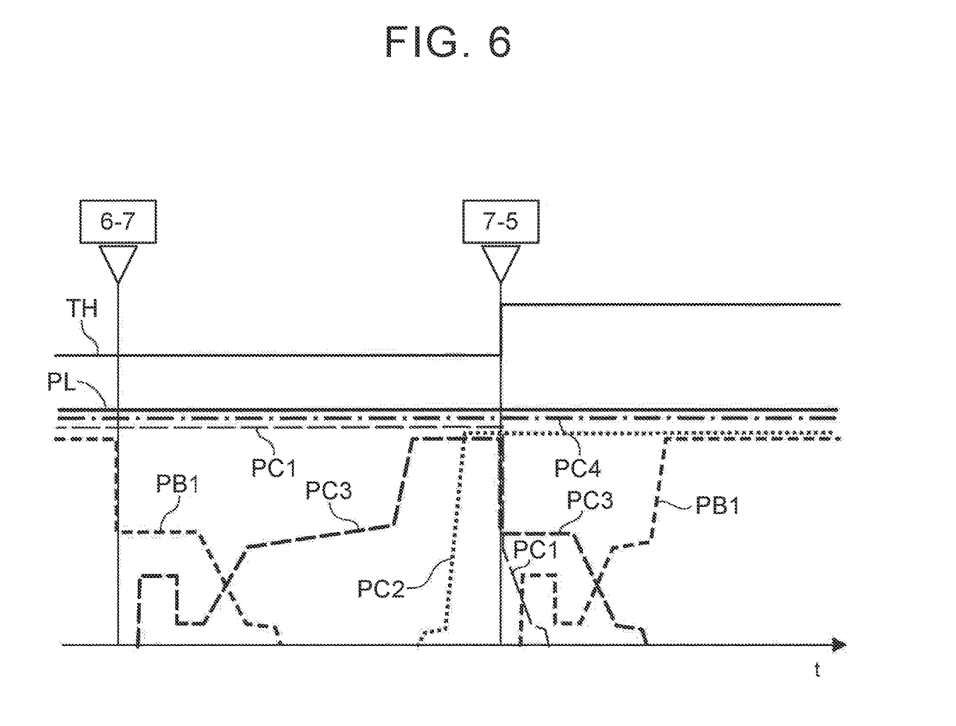
FIG. 6 is a timing chart of control oil pressures, showing a shift to the seventh speed as a direct coupling speed (from the sixth speed to the fifth speed) and a shift from the seventh speed to the fifth speed.

An embodiment of the control device of the automatic transmission which is a main part of a preferred embodiment will be described below. As shown in FIG. 5, a shifting operation to the seventh forward speed as a direct coupling speed is performed (S2), and shifting to the seventh forward speed is completed (S3). For example, as shown in FIG. 6, in the case of an upshift from the sixth forward speed to the seventh forward speed, the control unit determines that a shifting operation from the sixth speed to the seventh speed is to be performed. According to this determination of the control unit, from the state at the sixth speed where the control oil pressures PC1, PC4, PB1 are being supplied, the control unit performs control to release the control oil pressure PB1 and to supply the control oil pressure PC3. In FIG. 6, PL represents a line oil pressure, and TH represents a throttle opening (accelerator operation amount). By this control of the control unit, from the sixth speed where the first clutch C1, the fourth clutch C4, and the first brake B1 are in an engaged state, the first brake B1 is disengaged and the third clutch C3 is engaged. Shifting to the seventh speed as a direct coupling speed is thus completed, and the direct coupling speed is attained.

After the shifting operation to the seventh speed is completed, the remaining (other) one clutch other than the three engaged clutches of the four clutches is engaged at the seventh speed (S4). Specifically, as shown in FIG. 6, with the control oil pressures PC1, PC3, PC4 being supplied, the control unit outputs a signal to supply the remaining (other) control oil pressure PC2. The second clutch C2 is thus engaged in addition to the first, third, and fourth clutches C1, C3, C4. Since the seventh speed is a direct coupling speed, engagement of the second clutch C2 does not affect the direct coupling speed itself in any way. The second clutch C2 (the remaining one clutch) may be engaged at any time at the seventh speed. That is, the second clutch C2 may be engaged immediately after shifting to the seventh speed is completed (i.e., when the gear ratio calculated from the rotational speeds of the input shaft and the output shaft becomes equal to 1.000) or may be engaged after the vehicle starts traveling steadily at the seventh speed (e.g., when a predetermined time or more has elapsed after the gear ratio becomes equal to 1.000).

If the control unit determines that a shifting operation to a shift speed (other gear speed) other than the seventh speed is to be performed (S5), the control unit releases the clutches, out of the four clutches, which are not required for the target shift speed (S6) and performs shifting to the target shift speed (S7). For example, as shown in FIG. 6, if the driver depresses an accelerator pedal to request a downshift and the control unit determines that a jump shift from the seventh speed to the fifth speed is to be performed, the control unit immediately outputs a signal to release the control oil pressure PC1 for the first clutch C1 that is not required for the fifth speed. The control unit also performs control to gradually release the control oil pressure PC3 for the third clutch C3 and to gradually supply the control oil pressure PB1 for the brake B1 that is required for the fifth speed. Shifting to the fifth speed is thus completed by merely disengaging the third clutch C3 and engaging the first brake B1 with the second clutch C2, namely the clutch additionally engaged after completion of the shifting to the seventh speed, being kept in the engaged state. Conventionally, the operation of disengaging the first and third clutches C1, C3 and the operation of engaging the second clutch C2 need to be performed at the same time in order to shift from the seventh speed to the fifth speed. In the present embodiment, however, the engagement/disengagement states need only to be changed such that the first clutch C1 is immediately disengaged, and the third clutch C3 is controlled to be gradually disengaged and the first brake B1 is controlled to be gradually engaged. Improvement in shifting flexibility and shifting response can therefore be expected.

Figure 7:
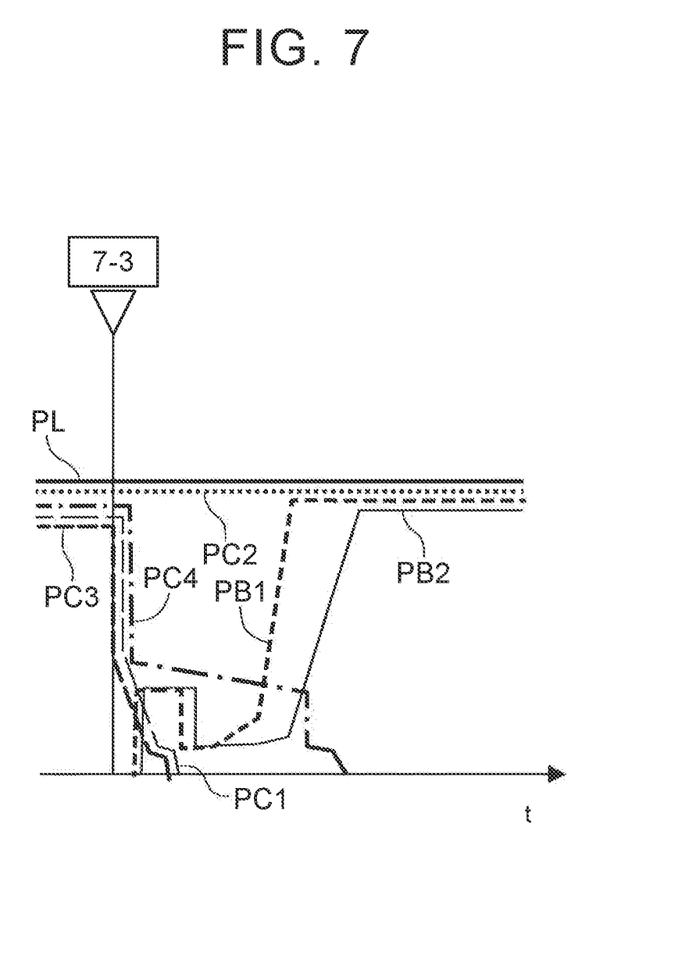
FIG. 7 is a timing chart of the control oil pressures, showing a shift from the seventh speed to the third speed.

FIG. 7 is a diagram showing a shift from the seventh speed as a direct coupling speed to the third speed. At the seventh speed, the first, third, and fourth clutches C1, C3, C4 are in an engaged state and the second clutch C2 is also in an engaged state, as described above. If the control unit determines that a shifting operation from the seventh speed to the third speed is to be performed, the control unit immediately outputs a signal to release the control oil pressure PC1 and the control oil pressure PC3. The control unit also performs control to supply the control oil pressure PB1 and to release the control oil pressure PC4. As a result, the first clutch C1 and the third clutch C3 are disengaged. Moreover, the fourth clutch C4 that is being controlled to be disengaged is still in the engaged state, and the first brake B1 is being controlled to be engaged. Accordingly, the fifth speed at which the second clutch C2, the fourth clutch C4, and the first brake B1 are engaged is temporarily attained.

The control oil pressure PC4 is gradually released and the control oil pressure PB2 is controlled to be gradually supplied. The second clutch C2 is thus kept in the engaged state, and the fourth clutch C4 is disengaged and the second brake B2 is engaged, whereby shifting to the third speed is completed. Accordingly, in the case of the shift from the seventh speed to the third speed, the fifth speed is temporarily attained, and the shifting thus proceeds smoothly. Moreover, the engagement/disengagement states of the two elements are changed with the second clutch C2 kept in the engaged state. Namely, the fourth clutch C4 is disengaged and the second brake B2 is engaged with the second clutch C2 kept in the engaged state. The jump shift can thus be achieved easily and smoothly.

Figure 8:
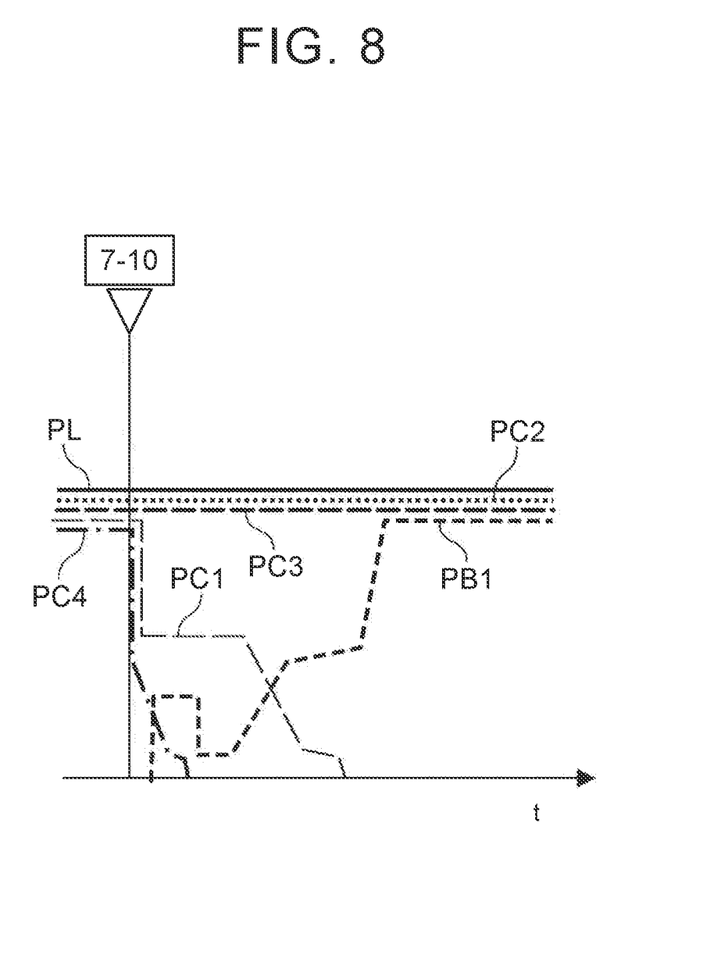
FIG. 8 is a timing chart of the control oil pressures, showing a shift from the seventh speed to the tenth speed.

FIG. 8 is a diagram showing a jump shift from the seventh speed as a direct coupling speed to the tenth speed. At the seventh speed, the second clutch C2 in addition to the first, third, and fourth clutches C1, C3, C4 are in an engaged state, as described above. If the control unit determines that a jump shift from the seventh speed to the tenth speed is to be performed, the control unit immediately outputs a signal to release the control oil pressure PC4. The control unit also performs control to gradually release the control oil pressure PC1 and to gradually increase the control oil pressure PB1. Accordingly, the first clutch C1 is disengaged and the first brake B1 is engaged with the second and third clutches C2, C3 kept in the engaged state. The jump shift from the seventh speed to the tenth speed is thus completed easily and smoothly.

Figure 9:
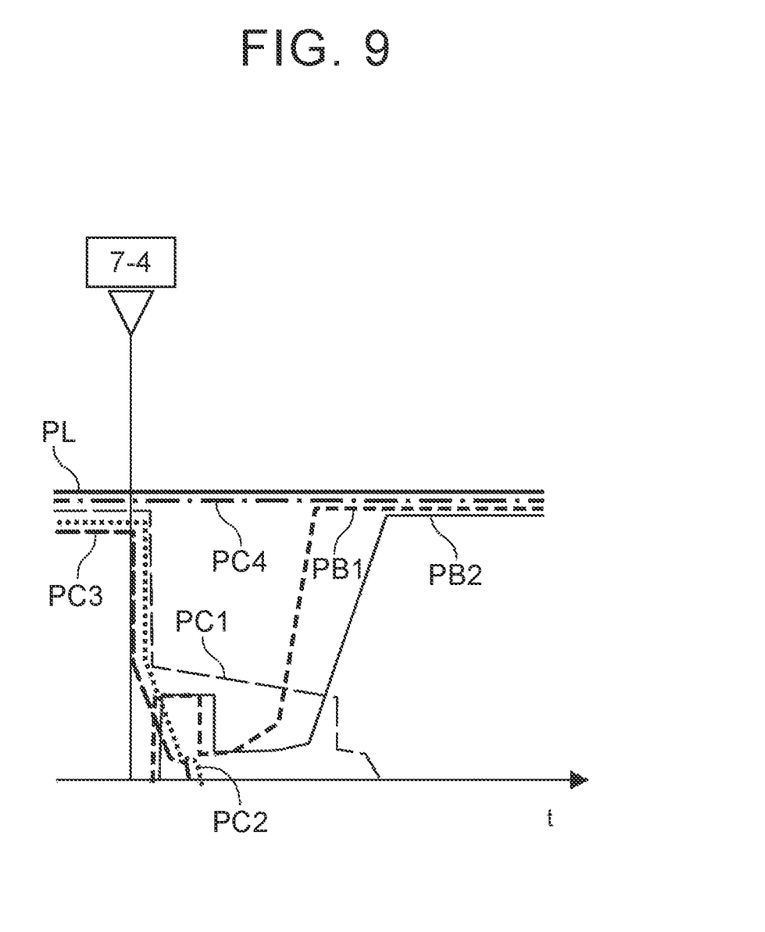
FIG. 9 is a timing chart of the control oil pressures, showing a shift from the seventh speed to the fourth speed.

FIG. 9 is a diagram showing a jump shift from the seventh speed as a direct coupling speed to the fourth speed. At the seventh speed, the first, second, third, and fourth clutches C1, C2 C3, C4 are in an engaged state, as described above. If the control unit determines that a jump shift from the seventh speed to the fourth speed is to be performed, the control unit immediately outputs a signal to release the control oil pressures PC2, PC3. The control unit also performs control to gradually release the control oil pressure PC1, supplies the control oil pressure PB1, and performs control to gradually supply the control oil pressure PB2. Shifting to the fourth speed at which the fourth clutch C4, the first brake B1, and the second brake B2 are engaged is thus completed. The second clutch C2 is disengaged in the case of the jump shift from the seventh speed to the fourth speed, a shift from the seventh speed to its adjacent speed, namely to the sixth speed and the eighth speed, and a shift from the seventh speed to the ninth speed and the second speed. Accordingly, for these shifting operations, it is of no use to engage the second clutch C2 at the seventh speed as a direct coupling speed. However, the operation of disengaging the second clutch C2 can be performed quickly and does not hinder the shifting operations. That is, when the seventh speed as a direct coupling speed is attained, the second clutch C2 is engaged regardless of the next shift speed to be attained, in order to prepare for shifting to the next predetermined shift speed. In the case where a shift signal from the direct coupling speed (the seventh speed) to its adjacent shift speed (the sixth speed or the eighth speed) is being output or it is predicted that such a shift signal is likely to be output, the control to engage the second clutch C2 may be omitted. Since the first clutch C1 and the second clutch C2 are in an engaged state at the seventh speed, a jump shift from the seventh speed to the first speed can be quickly performed by immediately disengaging the third clutch C3 and the fourth clutch C4 and performing control to engage the second brake B2.

The present embodiment is applied to the ten-forward speed automatic transmission shown in FIGS. 1 to 4. However, the present invention is not limited to this. The present invention is also applicable to ten-speed transmissions having other shift gear mechanisms and is applicable to automatic transmissions other than ten-speed automatic transmissions, namely automatic transmissions with less than ten shift speeds or more than ten shift speeds.

DESCRIPTION OF THE REFERENCE NUMERALS

4 Automatic Transmission
40 Input Shaft
41 Output Shaft
42 First Planetary Gear
42s First Sun Gear
42c First Carrier
42r First Ring Gear
43 Second Planetary Gear
43s Second Sun Gear
43c Second Carrier
43r Second Ring Gear
44 Ravigneaux Planetary Gear Mechanism
45 Double-Pinion Type Planetary Gear
45s Third Sun Gear
45c Third Carrier
45r Third Ring Gear
46 Single-Pinion Type Planetary Gear
46s Fourth Sun Gear
C1 First Clutch
C2 Second Clutch (Remaining Clutch)
C3 Third Clutch
C4 Fourth Clutch
B1 First Brake
B2 Second Brake
U Control Device

The invention claimed is:

1. A control device configured to operate an automatic transmission including only four clutches and only two brakes, and a shift gear mechanism that can engage or disengage the clutches and the brakes to change a power transmission path to shift to multiple shift speeds, and can attain shift speeds by engaging three engagement elements selected from the four clutches and the two brakes, wherein the control device is configured to:
   place the automatic transmission in a direct coupling speed, which is a shift speed at which input and output portions of the shift gear mechanism make the same rotation, by engaging three of the four clutches and disengaging all of the brakes,
   after the direct coupling speed is attained, the control device is configured to operate the automatic transmission so as to engage the remaining clutch in a disengaged state out of the four clutches at the direct coupling speed so that all of the four clutches are engaged, and
   after the direct coupling speed is attained and the remaining clutch is engaged, the control device is configured to cause the automatic transmission to jump-shift from the direct coupling speed to a predetermined shift speed, which is out of forward shift speeds other than shift speeds adjacent to the direct coupling speed, by disengaging two of the three clutches engaged in order to attain the direct coupling speed and engaging one of the brakes with the remaining clutch being kept in the engaged state.

2. The control device of the automatic transmission according to claim 1, wherein
   the control device is configured to cause the automatic transmission to shift to the predetermined shift speed by changing engagement/disengagement states so as to immediately disengage one of the two clutches that are to be disengaged in order to attain the predetermined shift speed out of the four clutches and so as to gradually disengage the other clutch and gradually engage the one brake that is to be engaged in order to attain the predetermined shift speed.

3. The control device of the automatic transmission according to claim 1, wherein when controlling the automatic transmission to jump-shift from the direct coupling speed to a shift speed that is farther from the direct coupling speed than the predetermined shift speed by disengaging three of the four clutches and engaging the two brakes, the control device causes the automatic transmission to disengage two of the three clutches to be disengaged and engages one of the brakes to first attain the predetermined shift speed, and then gradually disengages the clutch other than the two disengaged clutches out of the three clutches to be disengaged and gradually engages the remaining brake that has not been engaged.

4. The control device of the automatic transmission according to claim 1, wherein
the control device is configured to cause the automatic transmission to jump-shift from the direct coupling speed to a shift speed that is farther from the direct coupling speed than the predetermined shift speed, by first attaining the predetermined shift speed by the jump shift and then gradually disengaging the clutch other than the two disengaged clutches out of the three clutches and gradually engaging the remaining brake that has not been engaged.

5. The control device of the automatic transmission according to claim 1, wherein
the shift gear mechanism includes a single-pinion type first planetary gear, a single-pinion type second planetary gear, and a Ravigneaux type planetary gear mechanism as a combination of a double-pinion type planetary gear and a single-pinion type planetary gear,
a first carrier of the first planetary gear and a third carrier of the Ravigneaux type planetary gear mechanism are coupled to an input shaft, a second carrier of the second planetary gear is coupled to an output shaft, and a first sun gear of the first planetary gear and a second sun gear of the second planetary gear are coupled together,
the four clutches includes a first clutch interposed between the first and second sun gears coupled together and a third ring gear of the Ravigneaux type planetary gear mechanism, a second clutch interposed between the first and second sun gears coupled together and a third sun gear of the double pinion type planetary gear of the Ravigneaux type planetary gear mechanism, a third clutch interposed between a second ring gear of the second planetary gear and the third ring gear of the Ravigneaux type planetary gear mechanism, and a fourth clutch interposed between a first ring gear of the first planetary gear and the output shaft,
a fourth sun gear of the single-pinion type planetary gear of the Ravigneaux type planetary gear mechanism is coupled to a first brake of the two brakes, and the second ring gear is coupled to a second brake of the two brakes,
the control device is configured to control the automatic transmission to obtain ten forward speeds and one reverse speed by engaging or disengaging the first clutch, the second clutch, the third clutch, the fourth clutch, the first brake, and the second brake as appropriate, and
the seventh forward speed as the direct coupling speed is attained by engaging the first clutch, the third clutch, and the fourth clutch and disengaging the first brake and the second brake, and the second clutch is engaged at the seventh speed after shifting to the seventh speed is completed.

* * * * *